A. KEHM.
PIPE SUPPORT.
APPLICATION FILED AUG. 23, 1912.
1,056,028.
Patented Mar. 18, 1913.
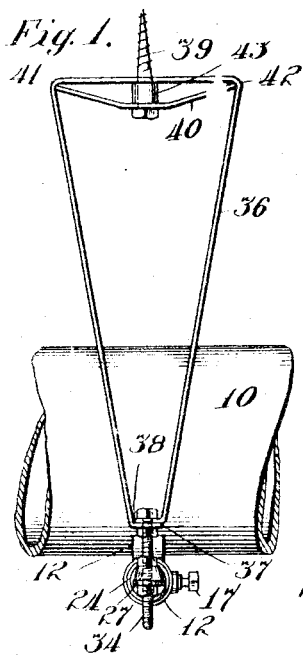
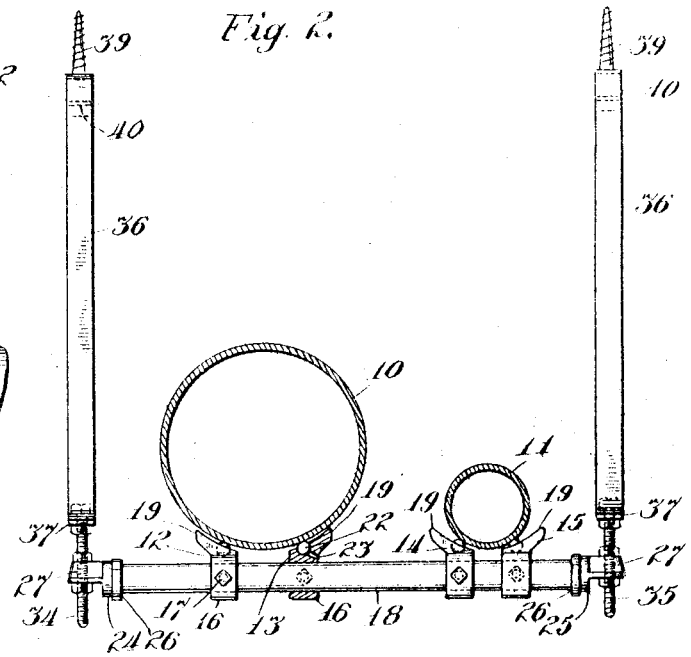
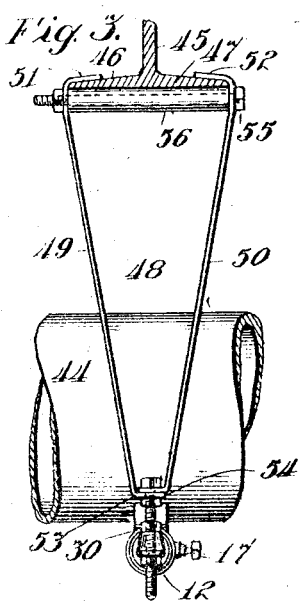
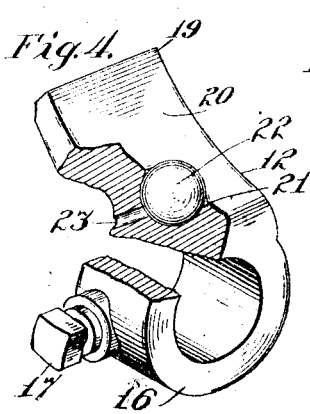
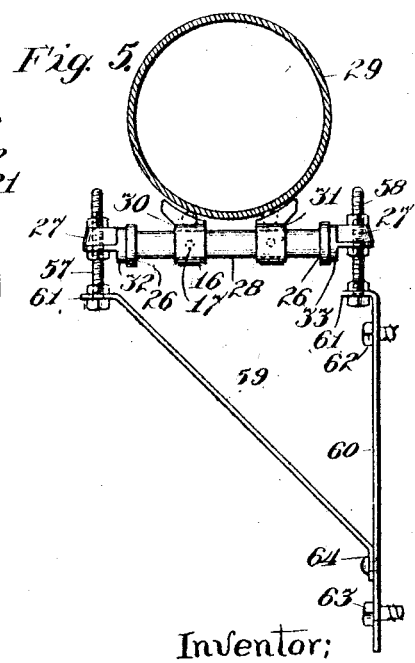
Witnesses:
Milton Lenoir
J. A. Helmich
Inventor:
August Kehm
by Gillson & Gillson
Attorneys

UNITED STATES PATENT OFFICE.

AUGUST KEHM, OF CHICAGO, ILLINOIS.

PIPE-SUPPORT.

1,056,028.  Specification of Letters Patent.  Patented Mar. 18, 1913.

Application filed August 23, 1912. Serial No. 716,632.

*To all whom it may concern:*

Be it known that I, AUGUST KEHM, a citizen of the United States, and resident of Chicago, county of Cook, and State of Illinois, have invented certain new and useful Improvements in Pipe-Supports, of which the following is a specification, and which are illustrated in the accompanying drawings, forming a part thereof.

The invention relates to pipe supports and more particularly to supports for those pipes which are employed for conveying a heating fluid and wherein provision is to be made for longitudinal movement of the pipe due to its expansion and contraction upon changes in temperature.

The object of the invention is to provide a pipe support which shall be efficient in service and which is so constructed as to facilitate its erection at the place of use.

The invention is exemplified in the structures which are hereinafter described and which are illustrated in the accompanying drawings, wherein—

Figure 1 shows in side elevation a form of trapeze support embodying the features of the improvement provided by the invention; Fig. 2 is a front elevation of the same, some of the parts being shown in section; Fig. 3 is similar to Fig. 1, but shows a slightly modified form of construction; Fig. 4 is a detail perspective view showing a form of saddle block which may be used for supporting the pipe; and Fig. 5 is a front elevation showing a bracket form of support embodying the features of improvement provided by the invention, the pipe supported thereby being shown in section.

A pair of pipes desired to be supported in substantially horizontal position are represented at 10 and 11, in Fig. 2 of the drawings. For the purpose of illustrating the adaptability of the invention for supporting pipes of different sizes, one of the pipes represented in Fig. 2 is of much larger size than the other. In carrying out the invention, a pair of oppositely facing saddle blocks, as 12, 13, and 14, 15, are located beneath each of the pipes to be supported and at opposite sides of its center line. These saddle blocks are preferably so formed as to be clamped in position upon any form of supporting member extending transversely below the pipes. As shown, each of the saddle blocks 12, 13, 14 and 15 is provided with a tubular form of base 16 having a clamping screw 17 extending thereinto from one side whereby it may be slipped onto a round member, as the pipe section 18, and clamped thereon in the desired adjusted position.

Each saddle block forms a partial seat for the pipe through being provided with an arm 19 which extends obliquely upward from the tubular base portion 16, and has its upper face 20 curved or hollowed out to substantially conform to the adjacent portion of the face of the pipe. Provision is made for longitudinal movement of the pipe on the saddle blocks by forming the face 20 of each saddle block with a ball socket 21 and mounting therein an anti-friction ball 22. Preferably the ball socket 21 is of such depth as to effectually retain the ball 22, while still leaving a part of the ball projecting beyond the face 20 to engage the pipe.

It has been found in practice that in the longitudinal movement of the pipes, as 10, upon the saddle blocks, during the expansion or contraction of the pipe, a considerable amount of scale is stripped from the surface of the pipe by the engagement of the ball 22 therewith, which scale finds its way into the ball socket 21. To prevent such an accumulation of this scale as would interfere with the turning of the ball, a drain opening 23 is preferably provided. As shown, this drain opening extends from the lower part of the ball socket 21 through the arm 19 to an opening upon the lower side of the arm. Any scale or other dirt which finds its way into the ball socket 21 about the ball 22 is accordingly worked into the drain passage 23 by the continued turning of the ball and is eventually discharged from the lower end of the drain opening at the under side of the arm 19. In this way the ball socket is kept free from an accumulation of scale or other dirt and the ball 22 turns freely therein, whenever there is any longitudinal movement of the pipe.

The use of separate saddle blocks, as 12, 13, for supporting the pipe at opposite sides of its median plane, permits of the employment of a single form of saddle blocks for supporting different sizes of pipe. For this purpose the two saddle blocks are so positioned upon the supporting member, as 18, as to properly receive the pipe upon the anti-friction balls 22 of the two saddle members. When the pipe is of considerable size, as shown at 10 in Fig. 2, the two saddle blocks, as 12, 13, will be located some distance apart. For supporting a smaller pipe, as 11, the two saddle blocks, as 14, 15, will be positioned somewhat closer together. This appears from an inspection of the relative positions of the saddle blocks 12, 13 and 14, 15, shown in Fig. 2. To facilitate the erection of a pipe support at the place of use, bracket caps, as 24, 25, are provided for the opposite ends of the pipe section 18. Each of these bracket caps has a threaded socket 26 for receiving the pipe end. It also has an apertured lug or eye 27 extending longitudinally outward from the threaded socket portion 26.

In the form of support shown in Fig. 5 of the drawings, a pipe section 28 is used. For engaging the pipe, as 29, the pipe section 28 is equipped with saddle blocks 30 and 31 similar in construction to the saddle blocks 12 and 13 shown in Fig. 2. The ends of the pipe section 28 are fitted with bracket caps 32 and 33 of the form shown at 24 and 25 in Fig. 2. In erecting a support at the place of use, the workman will cut off the pipe section 18 or 28 to the required length and thread its ends. He will then pass the tubular base portions 16 of the required number of saddle blocks, as 12, 13, 14 and 15, or 30 and 31, onto the pipe section, and will fit the bracket caps 24, 25, or 32, 33 upon its opposite ends. For this purpose he will not require other tools than a pipe cutter and a die of the form commonly at hand in places where erecting of the sort under consideration is to be accomplished.

The trapeze form of support illustrated in Figs. 1 and 2 of the drawings is completed by mounting a bolt, as 34, 35, in the apertured lug 27 of each of the bracket caps 24, 25. These bolts are each supported in a hanger 36. As shown, each of the hangers 36 is made from a single piece of strap iron bent to the form illustrated in Fig. 1, the ends of the strap iron being overlapped at the lower end of the hanger, as indicated at 37, 38, and connected by the bolts 34 and 35 respectively. A truss form of hanger designed to resist any swaying of the support during longitudinal movement of the pipes 10 and 11 is thus produced. The hangers 36 may each be secured to the ceiling beneath which the pipes 10, 11 extend, as by passing lag screws 39 through the mid-length of the strap iron from which the hanger is formed. If desired, the stiffness of the hanger may be increased by the use of a stay iron 40 beneath the head of each of the lag screws 39. This stay iron is shown as having its opposite ends flexed to engage the angles, as 41, 42, of the hanger 36, the intermediate portion of the stay iron 40 being spaced apart from the adjacent portion of the hanger 36 by the use of a bushing 43 sleeved onto the lag screw 39 between the stay iron 40 and the adjacent portion of the hanger 36. In some instances it may be desirable to support pipes, as 44, beneath a ceiling having beams, as 45. When the lower edge of the beam is formed with oppositely directed flanges, as 46, 47, the pipe support will be conveniently formed in the manner shown in Fig. 3. This figure shows a trapeze support identical in construction with that illustrated in Figs. 1 and 2, except that in lieu of the hangers 36, hangers of the form represented at 48 are employed. The hanger 48 is composed of a pair of strap irons 49, 50, each having its upper end over-turned, as indicated at 51, 52, to engage the corresponding flanges 46, 47 of the beam 45. The lower ends of the strap irons 49, 50 are over-turned and overlapped, as indicated at 53, 54, to receive a bolt, as 34. Hangers of this form may be securely clamped upon a beam, as 45. For this purpose, a bolt 55 is passed through the strap irons 49, 50, immediately below the flanges of the beam 45, to clamp these irons against the flanges of the beam. A rigid construction is provided by the use of a bushing 56 sleeved onto the bolt 55 between the strap irons 49 and 50.

The form of hanger shown in Fig. 5 may be conveniently used where a pipe, as 29, is to be supported from a side wall. In this instance, bolts 57, 58 are mounted in the apertured lugs 27 of the bracket caps 32, 33. A wall bracket form of support is then produced by the use of strap irons 59 and 60, each having an over-turned higher end 61 for connection with one of the bolts 57, 58. The strap iron 60 is secured in upright position against the wall, as by the use of lag screws 62, 63. The strap iron 59 is connected to the strap iron 60 at its lower end, as at 64, and extends obliquely upward therefrom, to its point of connection with the bolt 57.

In the use of any of the constructions shown, the parts of the hangers, as 36, 48, and the strap irons 59, 60, will preferably be cut to length and formed into shape at the shop. If then the workman is supplied with a quantity of these hangers or bracket pieces, as also with a number of saddle blocks, as 12, 13, and bracket caps of the form shown at 24, 25, he will be completely equipped to produce any of the forms of supports which are shown, merely by the use of his regular equipment of tools and such ordinary bolts and nuts and lengths of pipe as will be available at the place of erection. The constructions therefore provide pipe supports which may be conveniently erected, and they are further desirable in that they serve to effectually support the pipe without interfering with its longitudinal movement. By locating the ball 22 adjacent the lower end of the arm 19 of the saddle blocks, as 12, 13, that part of the arm which extends beyond the ball serves as a guide to prevent displacement of the pipe from its seat in the event of its being flexed, as by an unequal expansion of different parts of the pipe.

I claim as my invention:

1. A support adapted to serve for pipe of different sizes comprising, in combination, a bar extending transversely beneath the pipe to be supported, a pair of independently movable oppositely facing saddle blocks running on the bar and each having an oblique face forming a seat for an underside portion of the pipe, and means for clamping each of the saddle blocks in adjusted position on the bar.

2. A pipe support comprising, in combination, a bar extending transversely beneath the pipe to be supported and having a threaded end, a cap screwed upon the end of the bar and having an integral bracket lug and means connected with the bracket lug of the cap for supporting the bar.

3. A pipe support comprising in combination, a bar extended transversely beneath the pipe to be supported and having its opposite ends threaded, caps screwed upon the opposite ends of said bar and each carrying an integral apertured bracket lug, and screw bolts mounted in the apertures of the said bracket lugs and being connected with the building.

4. A pipe support comprising in combination, a bar extended transversely beneath the pipe to be supported and having its opposite ends threaded, caps screwed upon the opposite ends of said bar and each carrying an integral apertured bracket lug, a pair of truss form hangers each comprising a strap iron which is bent at opposite sides of its mid-length to provide an intermediate section adapted to be secured against the ceiling, and end sections extending obliquely downward to a juncture, the two ends of each strap iron being overlapped and provided with bolt-receiving apertures, and a bolt connecting the overlapped ends of each strap iron with the bracket lug of one of the said caps.

5. A pipe support comprising, in combination, a bar extending transversely beneath the pipe to be supported, means for supporting one end of the bar, an eye at the other end of the bar, a truss form hanger comprising a strap which is bent at opposite sides of its mid length to provide an intermediate straight section adapted to be secured against a flat part of the ceiling and end sections extending obliquely downward to a juncture, and a bolt connecting the two ends of the strap iron with the said eye at the end of the bar.

AUGUST KEHM.

Witnesses:
W. A. MERTZ,
WALLACE CRAIG.